No. 726,486. PATENTED APR. 28, 1903.
J. F. WITTEMANN.
APPARATUS FOR FINISHING BEER.
APPLICATION FILED FEB. 7, 1896. RENEWED SEPT. 11, 1902.
NO MODEL. 3 SHEETS—SHEET 1.
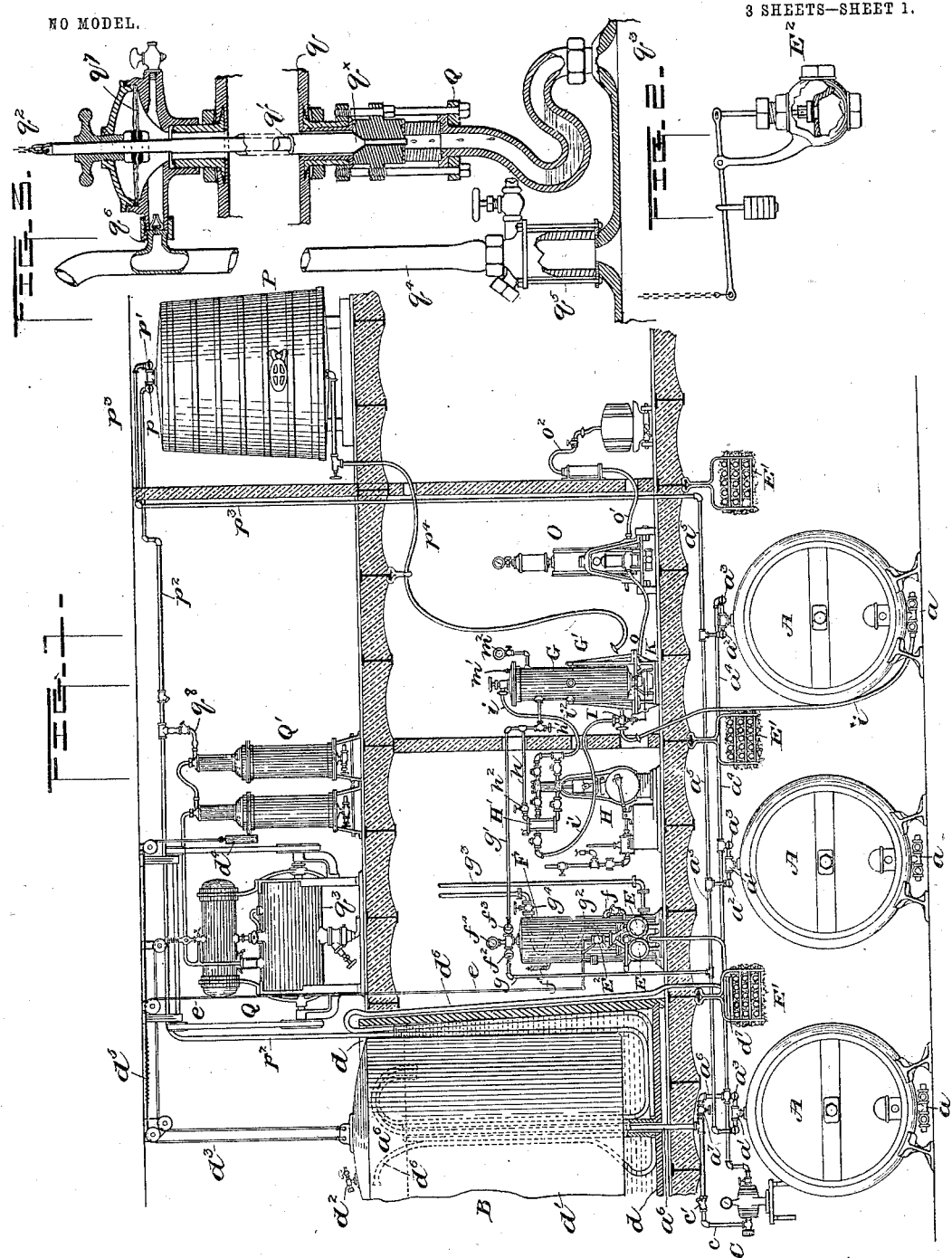

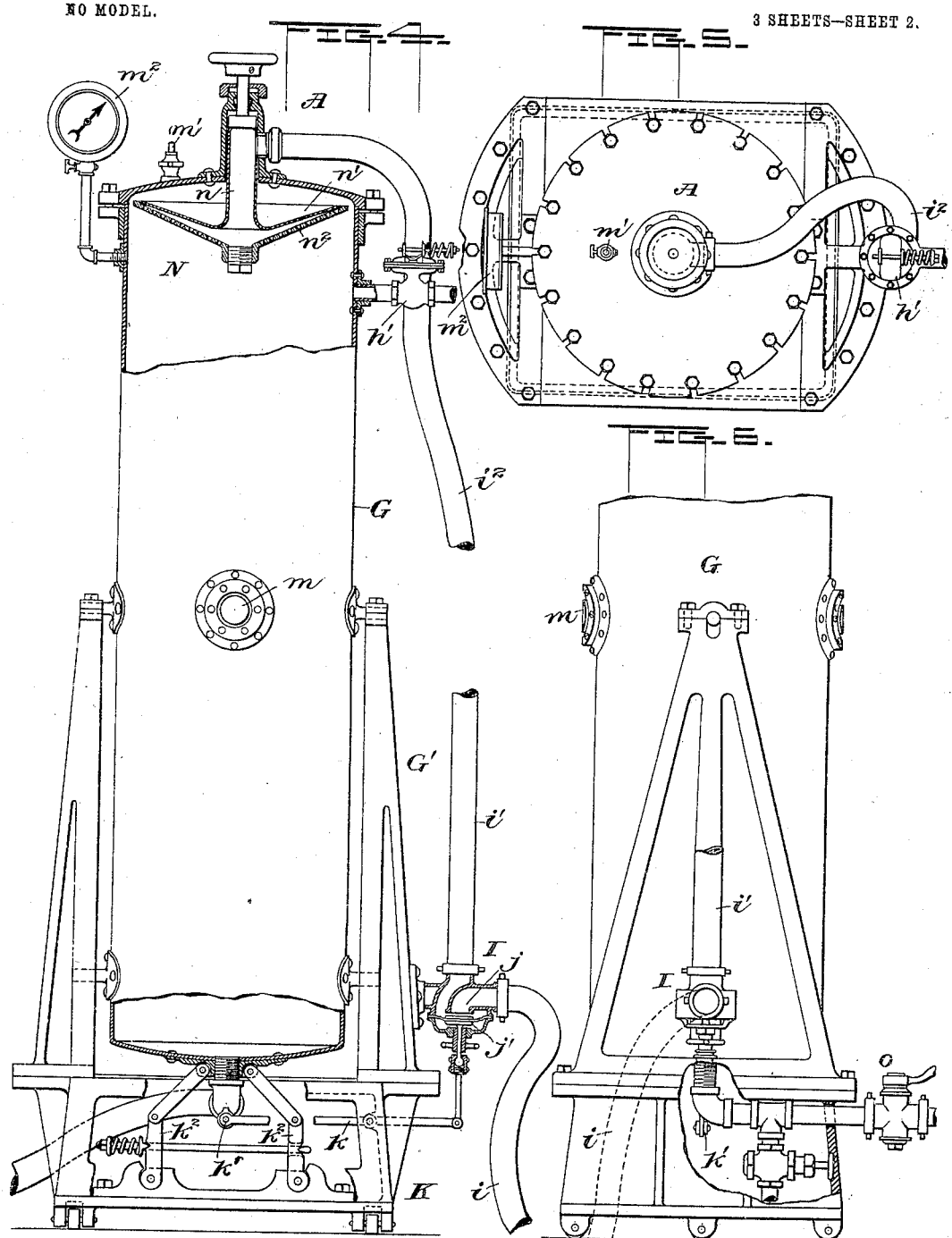

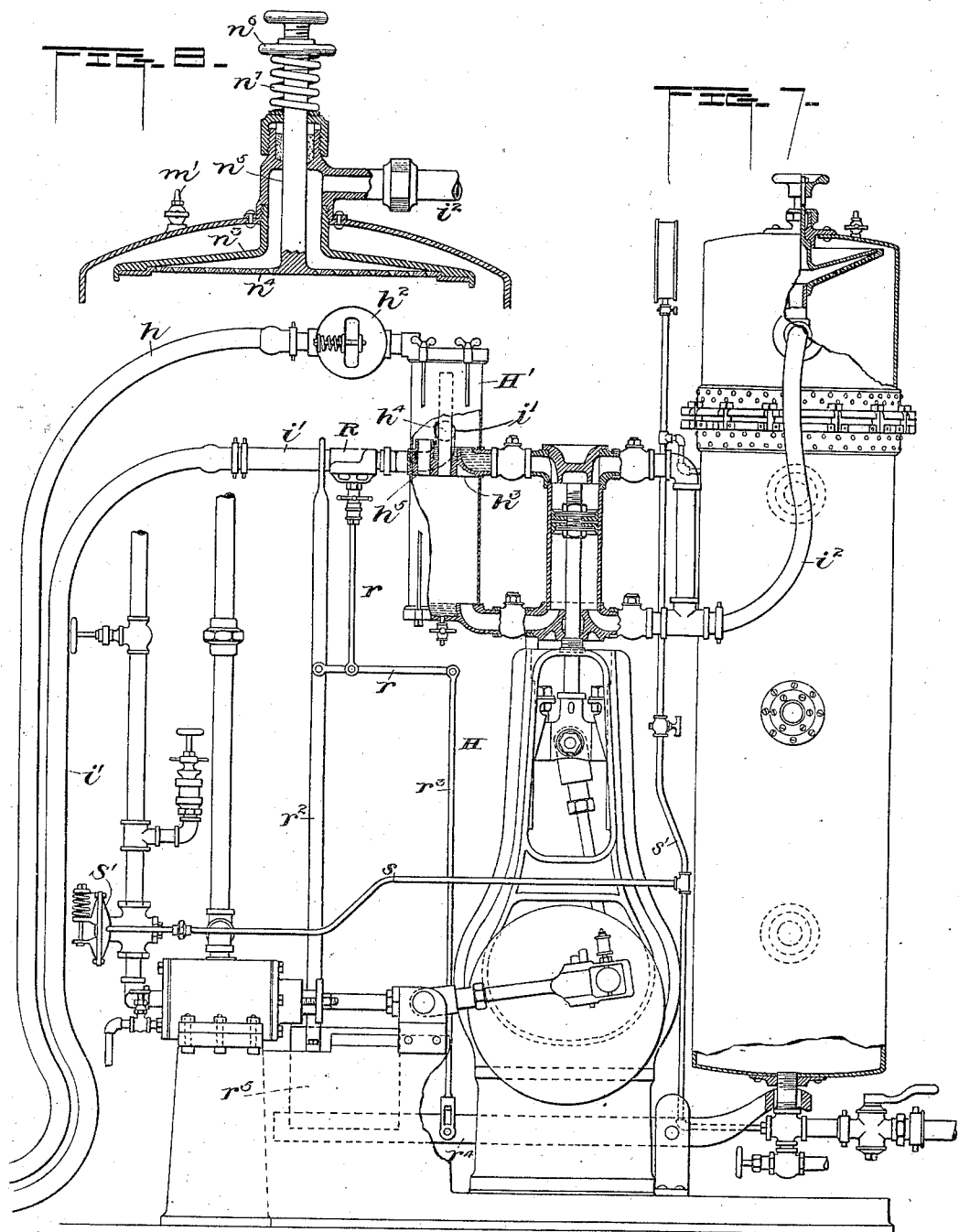

UNITED STATES PATENT OFFICE.

JACOB F. WITTEMANN, OF BROOKLYN, NEW YORK, ASSIGNOR TO THE WITTEMANN COMPANY, OF NEW YORK, N. Y., A CORPORATION OF NEW YORK.

APPARATUS FOR FINISHING BEER.

SPECIFICATION forming part of Letters Patent No. 726,486, dated April 28, 1903.

Application filed February 7, 1896. Renewed September 11, 1902. Serial No. 122,963. (No model.)

*To all whom it may concern:*

Be it known that I, JACOB F. WITTEMANN, a citizen of the United States, residing at Brooklyn, in the county of Kings and State of New York, have invented certain new and useful Improvements in Apparatus for Finishing Beer; and I do hereby declare the following to be a full, clear, and exact description of the invention, such as will enable others skilled in the art to which it appertains to make and use the same.

This invention relates to apparatus for treating effervescent beverages containing foam-producing elements, but more particularly to finishing lager and other beers ready for the market in a continuous operation.

The primary object of my invention is to provide means whereby a uniform and thorough impregnation of the beer or other liquid with carbonic-acid gas is obtained by causing a refrigeration of the gas before the beer is charged therewith or after the beer has been charged and before reaching the shipping-packages, so as to effect a partial condensation of the gas and cause the same to more readily unite with the liquid, and to provide a method whereby a brilliant beer may be secured and sufficiently chilled or refrigerated to cause the coagulation of such parts of the albuminous and other extract matter which it may be desirable to remove therefrom.

A further object is to provide means whereby a uniform level of liquid may be obtained in the charging apparatus, so as to provide a uniform height or column of gas through which the subdivided beer is to pass while being charged and to provide a constant head of carbonated beer for racking-off purposes.

Other objects are to provide means whereby the accumulation of the carbonic-acid gas in the fermenting or storage casks may be utilized for charging the beer and for other purposes, to provide a suitable vessel or gas-collector and automatic means for exhausting the carbonic-acid gas therefrom after the same has been separated from the nitrogen and other gases which may be mixed therewith, to provide means for supplying artificial carbonic-acid gas in case that the gas collected from the fermenting beer does not prove sufficient, to provide simple and convenient means for refrigerating the gas and supplying the same and the beer to the charging apparatus, and to provide a charging apparatus or carbonator adapted to regulate the supply of liquid thereto and provided with means for atomizing the beer within a column or atmosphere of carbonic-acid gas.

With these and other objects in view the invention consists in the improved apparatus substantially as hereinafter described, and then more particularly defined in the claims at the end of the description.

Referring to the accompanying drawings, forming a part of this specification, Figure 1 is a sectional view of a building, illustrating in elevation a preferred means for carrying my invention into effect. Fig. 2 is a detail view, partly in section, of an automatic governing device or valve for the gas-pump. Fig. 3 is a fragmentary sectional view of the gas-generating apparatus and means for regulating the same. Fig. 4 is a detail front elevation, partly in section, of one form of charging apparatus, illustrating means for automatically keeping the beer or other liquid at a uniform level. Figs. 5 and 6 are a plan view and a fragmentary side elevation, respectively, of the apparatus shown in Fig. 4.
Fig. 7 represents a modified form of beer and gas forcing and charging apparatus, illustrating means for regulating the speed of the force or supply pump and means for regulating the supply of beer or other liquid thereto;
and Fig. 8 is a fragmentary sectional view of a preferred form of atomizing or distributing head for the charging apparatus or carbonator.

Referring more particularly to Sheet 1, A may designate one form of "chip" or "bunging" casks, in which the beer may undergo either the main, secondary, or a "kraeusen" fermentation and which may be of any suitable construction, though preferably of the form ordinarily employed in breweries. These casks have racking or outlet connections $a$ in their lower portions and preferably a multiple connection $a'$ at their upper portions provided with valves $a^2\ a^3$, connected, respectively, to the pipes $a^4$ and $a^5$ in order to form a common connection between said casks. A connection $a^6$, provided with a suitable valve $a^7$, is connected to the pipe $a^4$ and has its outer end arranged so as to conduct the carbonic and other gases into the upper portion of a gasometer B or other suitable vessel or gas-collector, or the gases may be caused to pass through a suitable pressure governing or regulating device, as C, which is connected with the pipe $a^4$ and provided with a branch pipe $c$, having a suitable check-valve $c'$, and connecting said regulating device with the pipe $a^6$, beyond the valve $a^7$, so that when the valve $a^7$ is closed the beer in all or any of the casks A may be "bunged" under a greater back pressure than that secured by said gasometer. This gasometer may be of any suitable construction and arranged in any preferred manner and preferably comprises a tank $d$, containing a suitable liquid, an overflow therefor, and a suitable waste-pipe (not shown) connected with a sewer and a floating dome or drum $d'$ adapted to rise and lower in said tank, said floating dome being preferably provided with a combined safety and suction valve $d^2$, so as to permit the escape at intervals of the air, nitrogenous, or other gases which collect therein above the carbonic-acid gas, which latter, owing to its greater specific weight and the absence of pressure or agitation, at least not more than nominal pressure, separates from the other gases and sinks below the same. The floating dome may be suspended in the tank by means of the chain or other connection $d^3$, which passes over suitable pulleys and is connected to a counterweight $d^4$, said chain being provided intermediate its ends with a spring $d^5$ in order to allow sufficient play to the movement of the dome, while retaining the necessary tension on said chain. Within the floating dome is arranged a pipe $d^6$, having its upper end arranged above the liquid-level and adapted to convey the carbonic-acid gas therefrom to a suitable gas-pump E, the gas in its passage to said gas-pump being preferably refrigerated or chilled by passing through a coil $d^7$, located in or convenient to a refrigerating device, as E', for the purpose of a preliminary condensation of the gas previous to its compression by said pump. The gas-pump E is preferably provided with a governing-valve $E^2$—such, for instance, as shown in Fig. 2—for regulating the supply of steam or other impelling medium thereto. This valve is for the purpose of automatically maintaining the floating dome at a sufficiently high elevation within the gasometer-tank to provide space therein for the separation of the mixed gases that may be fed into the gasometer and is preferably provided with a weighted lever for actuating the valve to start the pump, the lever being connected by a chain $e$ or otherwise to the chain $d^3$ in order to close said governing-valve and stop the pump when said dome lowers. A connection $f$ is provided between the gas-pump E and the gas-receiver F, so that the carbonic-acid gas contained in the gasometer B may be forced in a compressed state into said receiver when the gas-pump is started, which occurs when there is sufficient gas within the floating dome to cause the same to rise beyond a predetermined point. The gas-receiver F may be provided with a thermometer $f'$, a multiple outlet having suitable pressure-reducing valves $f^2 f^3$, and a suitable pressure-gage $f^4$, also a drain connection at the bottom of said receiver (not shown) for the purpose of carrying off any liquid which may accumulate therein, either from condensation or from the liquid which may be used for the lubrication of the gas-pump being forced into said receiver. At $g$ is a pipe which connects the pressure-reducing valve $f^2$ with the pipe $a^5$ and its branches, so that by means of any of the valves $a^2$ gas under any suitable pressure may be conducted into any one of the casks A out of which the beer is to be racked, and at $g'$ is a pipe which conducts gas under suitable pressure into the cylinder G or tank of a carbonator or charging apparatus G', according to the degree of effervescence desired in the beer to be treated and the amount of friction and elevation to be overcome after it leaves said carbonator. The gas while in the receiver F is preferably reduced in temperature or refrigerated, and for this purpose a coil $g^2$ may be arranged therein, having its ends passed through said receiver and connected to the circulating-pipes $g^3$, in which a suitable valve $g^4$ may be located for regulating the circulation within said coil of whatever refrigerating medium it may be found desirable to employ.

For the purpose of forcing the beer into the cylinder of the charging apparatus or carbonator and for mixing the same with gas before being forced into said apparatus I preferably employ a compressor or pump H, which may be of any desired construction and preferably connected at its upper and lower ends to a gas and beer suction chamber H'. The upper portion of this chamber is connected by a pipe $h$ to the pipe $g'$ above the pressure-reducing or other valve $h'$ and is preferably provided with a pressure-reducing valve $h^2$, so as to regulate the quantity of gas fed into said chamber, as shown in Fig. 7. This chamber may have a division plate or tray $h^3$, provided with a pipe $h^4$, which forms a communication between the upper and lower portions of said chamber and of sufficient height to prevent the foam of the beer from entering and choking the same, and with a shorter or overflow pipe $h^5$, which permits part of the beer to pass into the lower portion of the chamber and flow into the connections between said chamber and the cylinder of the compressor, said connections being provided with check or other valves in order to prevent the gas and beer drawn into the compressor-cylinder being forced back into said suction-chamber.

I is a liquid-supply-regulating valve, which may be connected to either one of the casks A by a hose or other connection $i$ and with the suction-chamber H' above the division plate or tray $h^3$ by the hose or pipe $i'$. This regulator is best shown in Fig. 4 and preferably comprises an inlet $j$ and a valve $j'$, secured to a diaphragm and arranged adjacent to the mouth of said inlet, so as to increase or diminish the flow of the liquid therethrough when said valve is raised or lowered. The stem of the valve passes through a suitable stuffing-box on the regulator and has its lower end preferably connected by a ball-and-socket connection to one end of a lever $k$, the latter being pivoted to a suitable framework K, which forms a support for the carbonating apparatus. At the inner end of lever $k$ a suitable connection, as $k'$, is made with a portion of the charger or carbonator cylinder or tank G, so that when the said cylinder is raised or lowered the valve $j'$ will be caused to increase or diminish the passage for the liquid. This carbonator-cylinder is preferably provided with outwardly-projecting studs, which engage and are guided in slots in suitable standards forming a portion of the framework K, and is preferably provided at its lower portion with spring-pressed toggle-levers $k^2$, having their outer ends pivoted to said carbonator and the frame in order to counterbalance the weight of the carbonator-cylinder and liquid contained therein. By this means the liquid within the carbonator may be retained at a predetermined level, so as to provide a constant head of beer and a uniform column of gas for the passage of the beer while charging the same. The carbonator-cylinder G is preferably provided with one or more sight-glasses $m$ for ascertaining the height of the liquid therein, a valve or cock $m'$ to permit the escape of air, a gage $m^2$ for indicating the pressure, which it is desired should be constant, and in the upper portion thereof with a beer subdividing or atomizing head N, said head being provided with a tubular or other connection $n$, adapted to communicate with the beer or liquid supply pipe $i^2$, which may lead from the cylinder of the compressor H. A conical head may be provided, which comprises two plates $n'$ and $n^2$, the former being secured to or formed integrally with the connection $n$, the latter being provided with suitable perforations and secured at its periphery to the plate $n'$, so as to be separated therefrom by a suitable space in order to properly distribute the liquid over the entire surface of the plate $n^2$; but instead of this form I preferably provide a head such as shown in Fig. 8. In this case a conical or other plate $n^3$ is secured to the upper portion of the carbonating apparatus and arranged so as to communicate with the liquid or beer supply pipe $i^2$. This plate $n^3$ has secured thereto a preferably flat flexible spreading disk or diaphragm $n^4$, having suitable apertures, so as to distribute and give an atomizing effect to the beer when forced therethrough, the disk or diaphragm being provided with a stem $n^5$, which passes through a suitable packing or stuffing box on the carbonator, and has its outer end screw-threaded and provided with an adjusting-nut $n^6$. A spring $n^7$ is preferably interposed between the nut $n^6$ and the packing-box, so as to raise the diaphragm and diminish the space between the plate $n^3$ and said diaphragm, in order to automatically distribute the beer according to the varying pressure and supply of the beer or other liquid thereto, though a weight or weighted lever may be employed, if desired. The lower portion of the carbonator is provided with an outlet to drain the same and with a racking connection $o$, which may convey the beer to a filter O of any suitable construction, wherein the coagulated solids are eliminated from the passing body of beer; but in some instances the filter may be dispensed with and the liquid racked directly into the shipping or other packages. From filter O a hose $o'$ may conduct the beer or other liquid to any suitable racking apparatus $o^2$, by which the liquid may be drawn into the shipping or delivery packages or, as the case may be, into bottles.

When the beer is taken from casks or vats placed at an elevation sufficient to secure the required pressure at the entrance of the beer into the carbonator, as from the ordinary storage-casks P, the same may be provided with a multiple connection having valves $p$ and $p'$, similar to those shown on the bunging casks A, the valve $p$ being connected to a pipe $p^2$, so as to convey the gas generated therein to the gasometer B, while the valve $p'$ is connected by a pipe $p^3$ to the pipe $a^5$, so as to provide a sufficient pressure upon the beer in said casks for racking purposes. The lower portion of the casks may be provided with a racking connection to which a hose $p^4$ may be secured. This hose may be connected to the regulator I at the point where the hose $i$ is secured thereto, and the upper end of the hose $i'$ connected to the beer-inlet of the carbonator, in which case the compressor H and the suction-chamber H' may be dispensed with.

Should the supply of the carbonic-acid gas from the fermenting or storage casks be insufficient for the purpose of carbonating and racking, I prefer to employ a gas-generator Q, the working of which may be controlled by an acid-feed, such as shown in Figs. 1 and 3. This generator is provided with an acid-chamber $q$, through which the stem $q'$ of a valve $q^\times$ may pass and be connected by a chain $q^2$ or otherwise to the floating dome $d'$ of the gasometer, so that the valve may be raised to feed acid to the gas-generating chamber $q^3$ when said floating dome lowers. Interposed between the acid-chamber and gas-generating chamber is a suitable sight-glass and a trap provided with a drain (not shown) for the acid in case the charge within the generating-chamber should boil over, said trap being adapted to convey the acid to the generating-chamber. A pipe $q^4$ is connected to the generating-chamber, having a combined trap and sight-glass $q^5$ and a branch connection $q^6$, through which a portion of the gas generated in the chamber $q^3$ may pass into the acid-chamber $q$ in order to equalize the pressures in said chambers, while the greater portion of the gas is conveyed through pipe $q^4$ to the purifiers Q'. The valve-stem $q'$ may enter the acid-chamber $q$ through a suitable casing, as shown in Fig. 3, within which is a diaphragm $q^7$, closely surrounding said stem to prevent escape of the gases. From the purifiers a pipe $q^8$, having a suitable check-valve, conveys the gas to the pipe $p^2$, through which the gas is conveyed to the gasometer, said pipe $p^2$ being provided with a check-valve to prevent passage of the gas to the storage-casks P.

The manner of using and constructing the invention will be readily understood from the foregoing description when taken in connection with the accompanying drawings. The parts being connected, as shown in Fig. 1, and the valves $a^2$ and $p'$ of the multiple connections closed, it will be seen that the gas arising from the beer in the casks A and P will escape through the pipes $a^4$—$a^6$, and $p^2$, respectively, into the gasometer, and when the gas collects therein, so as to raise the dome beyond a predetermined height, either from the supply of gas in said casks or from the separate generator Q in the manner heretofore described, the governor or regulator $E^2$ will be operated by the floating dome $d'$, so as to start the gas-pump E. The surplus gas in the gasometer will now be drawn through the pipe $d^6$ and coil $d^7$, compressed, and forced by said pump into the receiver F, where the gas may be further refrigerated and condensed by the coil $g^2$. Should it be desired to rack and charge the beer in either of the casks A—as the right one, for instance—the valve $a^3$ of the multiple connection is closed and gas under suitable pressure is conveyed from the receiver F through the pipes $g$ and $a^5$ and its branch connection through the valve $a^2$ into the said cask, at which time the racking connection $a$ thereof may be opened, so as to permit the beer to be forced through the pipe $i$ into and through the liquid-supply regulator I, where the supply of beer or other liquid is regulated according to the height or level of the charged liquid in the carbonator, as heretofore explained, then conveyed into the suction-chamber H' and therein evenly distributed to the connections of the compressor-cylinder. Simultaneously with the supply of beer to the suction-chamber gas under a suitable and constant pressure is conveyed to the carbonator from the receiver F by the means of the pipe $g'$ and reducing-valve $f^3$, and under suitable pressure into the suction-chamber H' through the pipe $h$ and reducing-valve $h^2$. The compressor H being now started will draw a mixture of liquid and gas from the chamber H' and will force the same into and through the atomizing or distributing head of the carbonator-cylinder G into and through the body or atmosphere of refrigerated gas maintained therein. The beer will pass through the column of gas in a subdivided state, so as to be fully saturated therewith, and will connect in the bottom of the carbonator, where, by means of the racking connection $o$, the same may be conveyed to the filter and from there to the racking-off apparatus $o^2$. I thus provide by this method a thorough impregnation of the beer with the carbonic-acid gas, also a simple and convenient means for regulating the supply of beer and gas to the carbonator and for collecting the gas from the fermenting and storage casks.

In Fig. 7 a modified arrangement is shown for regulating the supply of beer or other liquid to the carbonator and for regulating the speed of the compressor H according to the pressure which it is desired to maintain in said carbonator. For regulating the supply of beer or liquid a regulator R may be arranged in the pipe $i'$ and provided with a pendent valve-stem $r$, which is pivotally connected to a lever $r'$, said lever having one end thereof pivoted to a suitable brace or standard $r^2$ and its other end pivotally connected to a link $r^3$. This link has its lower end pivoted to a lever $r^4$, which latter may be pivoted intermediate its ends to a standard or portion of the frame of the compressor and have one end provided with a counterweight $r^5$ and its other end engaging a portion of the frame of the carbonator in order to counterbalance the weight of the carbonator cylinder or tank and the liquid contained therein. The carbonator-cylinder may be arranged in a framework similar to that shown in Fig. 4 and is adapted to actuate the valve-stem $r$ when the carbonator rises or lowers, so as to regulate the supply of beer or liquid to the suction-chamber H', though it will be understood that the regulator and means for operating the same may be employed when the beer or other liquid is supplied directly to the carbonator-cylinder. A regulator S' may be arranged in the steam connection of the compressor, adapted to operate a suitable valve for varying the speed thereof according to the pressure in the carbonator. At $s$ is a pipe leading from the regulator to a pipe $s'$, which has a communication with the upper and lower portion of the carbonator in order to equalize the pressure in the carbonator-cylinder and to permit a pressure to be exerted to operate the valve of the regulator S', said pipe $s$ being provided with a gage for ascertaining the pressure in said carbonator.

It is obvious that any suitable vessel or collector for gas provided with means for automatically actuating the gas-pump may be employed instead of the gasometer B and that instead of refrigerating the gas before it is fed to the carbonator the same may be caused to pass through or convenient to a refrigerating medium or to expand under regulated pressures, so as to uniformly reduce its temperature to the desired or approximately desired degree of temperature, or the gas may be caused to sufficiently condense by refrigerating the mixture of gas and liquid after it is discharged from a carbonator or while in said carbonator and before reaching the shipping or storage packages in order to thoroughly commingle the gas with the liquid and to chill the liquid. I, however, prefer to refrigerate the gas before the liquid is charged therewith, as shown in Fig. 1. Instead of using a gas-generator tanks containing liquid carbonic-acid gas may be employed for supplying gas to charge the liquid, and such expanded liquid carbonic-acid gas or gas from a generator may be used with or without gas gained from fermentation.

Having thus fully described my invention, what I claim as new, and desire to secure by Letters Patent of the United States, is—

1. In a plant for preparing beer and other liquids for the market, the combination with a gasometer comprising a tank and a floating dome adapted to rise and lower therein, of means for supplying gas thereto, a receiver, a pump provided with a connection leading to the supply of gas in said dome, a governor for said pump, together with a connection between said governor and the floating dome for automatically maintaining said floating dome at a sufficient height to provide space for the separation of the mixed gases that may be fed into the gasometer, substantially as described.

2. In a plant for preparing beer and other liquids for the market, the combination, with a gasometer comprising a tank and a floating dome adapted to rise and lower therein, of the bunging and storage casks and means for conveying the gas arising from the beer in said casks to the floating dome, a gas-receiver, a pump provided with a connection leading to the gas in said dome, a governor for said pump, together with a connection between said governor and the floating dome adapted to operate the same so as to regulate the speed of the pump and to automatically maintain the floating dome at a sufficient height to provide space for the separation of the mixed gases that may be fed into the gasometer, substantially as described.

3. In a plant for preparing beer and other liquids for the market, the combination with a suitable gas collector or vessel provided with an automatic valve or blow-off in the upper portion thereof, a carbonic-acid-gas generator and means for conveying the gas generated therein to said gas-collector, a receiver, a pump and connections therefor for automatically controlling said pump so as to exhaust the carbonic-acid gas in said gas-collector and force the same into said receiver, together with mechanism for automatically controlling the supply of gas to the collector, substantially as described.

4. In a plant for preparing beer and other liquids for the market, the combination with a suitable gas-collector and means for supplying carbonic-acid gas thereto, a receiver, a pump and connections therefor for automatically controlling said pump so as to exhaust and force the carbonic-acid gas from said collector into the receiver, a carbonator, a connection provided with a reducing-valve for conveying gas from the receiver to said carbonator, means for supplying liquid to the carbonator under a substantially constant head, racking connections for said carbonator, together with means for refrigerating and condensing the carbonic-acid gas, substantially as described.

5. In a plant for finishing beer or like beverages, the combination of a carbonator, a suction-chamber and means for supplying gas and liquid thereto, a compressor for forcing liquid and gas together from the said suction-chamber to said carbonator, and means for supplying gas to the latter, substantially as described.

6. In a plant for preparing beer and other liquids for the market, the combination with a gasometer or gas-collector provided with a valve or blow-off connection in the upper portion thereof, a receiver, a pump and means for automatically controlling the same for exhausting and forcing the carbonic-acid gas in said gas-collector into the receiver, a carbonator, a suction-chamber and means for supplying gas and beer under a substantially constant head thereto, a compressor for forcing liquid and gas from the suction-chamber to said carbonator, a connection provided with a reducing-valve for conveying gas from said receiver to the carbonator, racking connections for said carbonator, together with means for condensing the carbonic-acid gas, substantially as described.

7. In a plant for preparing beer for the market, the combination with a suitable gas-collector provided with a valve or blow-off at the upper portion thereof, of the fermenting or storage casks and means for conveying the carbonic-acid gas generated therein into said gas-collector, a bunging apparatus, a receiver, a pump for exhausting the carbonic-acid gas from the gas-collector and forcing the same into the receiver, connections between the receiver and said casks for racking purposes, a carbonator, a connection provided with a reducing-valve for conveying gas from said receiver to the carbonator, means for supplying beer under a substantially constant head to said carbonator, and racking connections for the carbonator, substantially as described.

8. In a plant for preparing beer and other liquids for the market, the combination with a suitable frame, of a suitable vessel, and means for supplying carbonic-acid gas under a uniform pressure thereto, a liquid-supply pipe for said vessel, a regulator or governor arranged in said supply-pipe, spring-pressed toggle-levers for yieldingly supporting said carbonator and serving as a counterbalance therefor, together with a lever actuated by the rising and lowering of said vessel and adapted to open or close the valve of said regulator, substantially as described.

9. In a carbonator, the combination with a suitable vessel provided with a gas-supply inlet and an inlet for the supply of liquid, of a subdividing-head arranged in said cylinder and communicating with said liquid-inlet, comprising a deflecting or spreading plate and a perforated plate, one of said plates being yieldingly secured to the other so as to be adjustably spaced apart, and to evenly distribute the liquid, substantially as described.

10. In a carbonator, the combination with a suitable vessel provided with a gas-supply inlet and an inlet for the supply of liquid, of a subdividing-head arranged in said cylinder communicating with said liquid-inlet and comprising a spreader or deflecting-plate, and a perforated plate or diaphragm yieldingly secured to and suitably spaced apart from the other, a guiding-stem secured to the plate and means for exerting a yielding pressure on said stem, whereby the space between the plate and diaphragm may be varied, so as to automatically evenly distribute the liquid over the said diaphragm according to the varying pressure and supply of beer or other liquid thereto, substantially as described.

In testimony whereof I affix my signature in presence of two witnesses.

JACOB F. WITTEMANN.

Witnesses:
CHAS. SPINDLER,
HERMANN COLBERG.